United States Patent
Zhang et al.

(10) Patent No.: US 11,397,960 B2
(45) Date of Patent: Jul. 26, 2022

(54) DIRECT MARKETING VIA CHAINED INTERACTIONS IN A BLOCKCHAIN

(71) Applicant: International Business Machines Corporation, Armonk, NY (US)

(72) Inventors: Jin Zhang, Beijing (CN); June-Ray Lin, Taipei (TW); Ju Ling Liu, Beijing (CN); Nan Chen, Beijing (CN); Li Bo Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 280 days.

(21) Appl. No.: 16/004,598

(22) Filed: Jun. 11, 2018

(65) Prior Publication Data

US 2019/0378152 A1 Dec. 12, 2019

(51) Int. Cl.
*G06Q 30/02* (2012.01)
*G06Q 20/06* (2012.01)

(52) U.S. Cl.
CPC ......... *G06Q 30/0214* (2013.01); *G06Q 20/06* (2013.01)

(58) Field of Classification Search
CPC combination set(s) only.
See application file for complete search history.

(56) References Cited

U.S. PATENT DOCUMENTS

| | | | |
|---|---|---|---|
| 8,069,099 B2 | 11/2011 | Chan et al. | |
| 9,014,661 B2 | 4/2015 | deCharms | |
| 2007/0207780 A1* | 9/2007 | McLean | G06Q 30/02 455/414.1 |
| 2014/0032291 A1 | 1/2014 | Sheperd | |
| 2014/0164082 A1* | 6/2014 | Sun | G06Q 30/02 705/14.16 |
| 2016/0071162 A1* | 3/2016 | Ogawa | G06Q 50/01 705/14.66 |
| 2017/0046526 A1* | 2/2017 | Chan | H04L 63/062 |
| 2017/0085545 A1 | 3/2017 | Lohe et al. | |
| 2017/0169363 A1* | 6/2017 | Salmasi | G06Q 10/02 |
| 2018/0165416 A1* | 6/2018 | Saxena | G06F 21/6245 |
| 2018/0205555 A1* | 7/2018 | Watanabe | H04L 9/3226 |
| 2019/0378152 A1* | 12/2019 | Zhang | G06Q 30/0214 |
| 2021/0119785 A1* | 4/2021 | Ben-Reuven | H04L 63/126 |

OTHER PUBLICATIONS

C.M. Sashi (2012). Customer engagement, buyer-seller relationships, and social media. Management Decision, vol. 50 Issue: 2, pp. 253-272, https://doi.org/10.1108/00251741211203551.
Shi, N., Wang, K., & Hong, Y. (2012). Social commerce in a networked society: Considering social distance and norms in referral incentive mechanisms for online business. Retrieved from https://dialog.proquest.com/professional/professional/docview/1357442130?accountid=142257.

* cited by examiner

*Primary Examiner* — Chrystina E Zelaskiewicz

(57) ABSTRACT

An example operation may include one or more of creating a smart contract with a conditional result distribution schedule for one or more referral events performed by account profiles associated with approved sites, storing the smart contract in a blockchain, identifying the one or more referral events being performed on the one or more approved sites, and storing the one or more referral events in the blockchain.

16 Claims, 20 Drawing Sheets

100K

180

ADVERTISEMENTS/RULES
REFERRER RESULT DISTRIBUTION IS
DIVIDED BY ALL REFERRERS ON THE
CHAIN

SELLER API: HTTPS:/
SMART CONTRACT:
REFERRAL_LIST = [('A', 'XYZ'), ('B', 'XZY')]
IF DEAL:
FOR REFERRER IN REFERRER_LIST:
RESULT(REFERRER/
LEN(REFERRER_LIST))

FIG. 1K

DIRECT MARKETING VIA CHAINED INTERACTIONS IN A BLOCKCHAIN

TECHNICAL FIELD

This application generally relates to monitoring online marketing of advertisements, and more specifically to performing direct marketing via chained interactions between various participants and managing the advertisement tracking in a blockchain.

BACKGROUND

A ledger is commonly defined as an account book of final entry, in which transactions are recorded. Ledgers can be stored on paper or electronically on a computer. A distributed ledger is ledger that is replicated in whole or in part to multiple computers cryptographic distributed ledger (CDL): can have at least some of these properties: irreversibility—once a transaction is recorded, it cannot be reversed accessibility—any party can access the CDL in whole or in part chronological and time-stamped: all parties know when a transaction was added to the ledger consensus based: a transaction is added only if it is approved, typically unanimously, by parties on the network verifiability—all transactions can be cryptographically verified. A blockchain is an example of a CDL. While the description and figures below are described in terms of a blockchain, the instant application applies equally to any CDL.

A distributed ledger is a continuously growing list of records that typically apply cryptographic techniques such as storing cryptographic hashes relating to other blocks. A blockchain is one common instance of a distributed ledger and may be used as a public ledger to store information. Although, primarily used for financial transactions, a blockchain can store various information related to goods and services (i.e., products, packages, status, etc.). A decentralized scheme provides authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary. Blockchain is a distributed database that maintains a continuously-growing list of records in the blockchain blocks, which are secured from tampering and revision due to their immutable properties. Each block contains a timestamp and a link to a previous block. Blockchain can be used to hold, track, transfer and verify information. Since blockchain is a distributed system, before adding a transaction to the blockchain ledger, all peers need to reach a consensus status. Marketing and promotion channels, such as television, radio, news conferences, online websites, etc., are all well established mediums for sharing marketing information. More recently, social network advertising is becoming increasingly popular as a preferred medium to share advertisements. Since social networking is based on a complicated mesh model of participants, identified via their user profiles, it is burdensome to pinpoint which accounts/profiles are supposed responsible for posting the advertisements on their social network accounts and promoting sponsored advertisements.

SUMMARY

One example embodiment may provide a method that includes one or more of creating a smart contract with a conditional result distribution schedule for one or more referral events performed by account profiles associated with approved sites, storing the smart contract in a blockchain, identifying the one or more referral events being performed on the one or more approved sites, and storing the one or more referral events in the blockchain.

Another example embodiment may include an apparatus that includes a processor configured to create a smart contract with a conditional result distribution schedule for one or more referral events performed by account profiles associated with approved sites, store the smart contract in a blockchain, identify the one or more referral events being performed on the one or more approved sites, and store the one or more referral events in the blockchain.

Yet another example embodiment may provide a non-transitory computer readable storage medium configured to store instructions that when executed cause a processor to perform one or more of creating a smart contract with a conditional result distribution schedule for one or more referral events performed by account profiles associated with approved sites, storing the smart contract in a blockchain, identifying the one or more referral events being performed on the one or more approved sites, and storing the one or more referral events in the blockchain.

BRIEF DESCRIPTION OF THE DRAWINGS

FIG. 1K illustrates an example of a revised smart contract that includes additional referrers which will be part of the final distribution results, according to example embodiments.

DETAILED DESCRIPTION

Figure 1A:
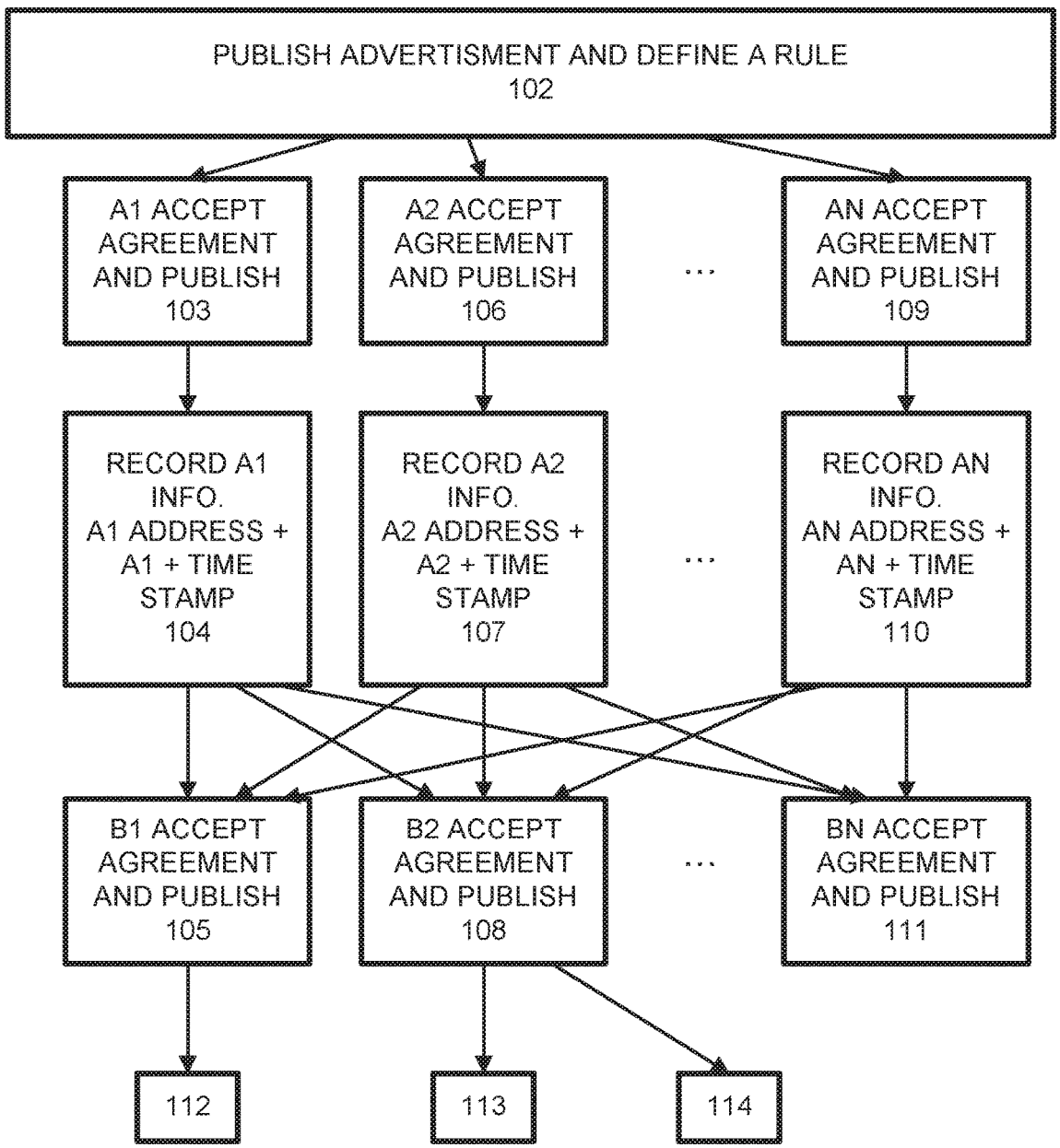
FIG. 1A illustrates a logic diagram of an advertisement and rule management configuration using a blockchain, according to example embodiments.

It will be readily understood that the instant components, as generally described and illustrated in the figures herein, may be arranged and designed in a wide variety of different configurations. Thus, the detailed description of the embodiments of at least one of a method, an apparatus, a non-transitory computer readable medium and a system, as represented in the associated figures and description, is not intended to limit the scope of the application, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of messages or network data, such as, packet, frame, datagram, etc. Furthermore, while certain types of messages, signaling and protocols may be depicted in exemplary embodiments they are not limited to a certain type of message, signaling or protocol.

Example embodiments provide methods, devices, networks and/or systems, which support a blockchain distributed system. A blockchain is a distributed system which includes multiple nodes that communicate with each other. A blockchain operates programs called chaincode (e.g., smart contracts, etc.), holds state and ledger data, and executes transactions. Some transactions are operations invoked on the chaincode. In general, blockchain transactions typically must be "endorsed" by certain blockchain members and only endorsed transactions may be committed to the blockhcain and have an effect on the state of the blockchain. Other transactions which are not endorsed are disregarded. There may exist one or more special chaincodes for management functions and parameters, collectively called system chaincodes.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Example embodiments provide a method, device, computer readable medium, and system for managing advertisement distribution and referrals. In operation, when advertisements are shared online via web interfaces, such as in social network sites, certain rules are created and used to distribute the advertisements. One example may provide that if a marketed product was sold through online advertisements in a one-month period of time, all participants of the advertisement chain can share a 10% result, and if the time period extends more than two months, the participants to the advertisement sharing chain can share an 8% result. If 10 products are sold all at once, all members in the chain can also be identified to receive a larger result.

In one example, a first online profile 'A' may have identified the advertisement posting and posted the advertisement to his/her own social network of participants, if profile 'B' who is in A's network also wanted to share the product then that profile may have been used to publish the advertisement information again, and so on, with profile C sharing to profile D. In this example, D may have been a real customer profile who wanted and purchased the product, which may have also been recorded in the advertisement sharing chain. When the dealings are completed, the chain may provide A, B and C as candidate profiles that shared the benefit incentive based on the set rules. A blockchain may be used to store a smart contract for the conditional results for every referral that took place leading up to the purchase(s). By enabling a "share" option with a script that generates smart contracts, based on a current referral chain, and a "buy" button to cause the script to trigger the smart contract, then certain chained referrals may be identified based on the smart contract and the results can be logged in the blockchain.

An example of a sharing scenario provides an originating seller of a product digitally signing a hash of the sales contents and sharing the signed contents, which may include: contents+digital signature. Next, a referrer may digitally sign with their signature in addition to previous signatures of the seller and other earlier referrers in the referrer chain, which may have previously referred the advertisement information. The referrer can then post the signed contents on a new online group/club/blog, etc., defined as a personal channel on a social media site or any other online forum for information sharing. The referrer may notify the seller of new potential customers reached during the sharing efforts. The seller verifies the customer list and generates a smart contract for corresponding signatures on the blockchain for other potential referrers to verify in later transactions. This provides a record of the referring in the blockchain for producing incentives. The result is multiple smart contracts being written to the blockchain, with each new one taking the place of the previous ones.

In an example of buying a product, the buyer sends the signed contents, containing nested signatures identified for referrers leading up to the purchase event to the seller. The seller then sends the goods to the buyer. The seller and/or any referrer on the shared content advertisement chain triggers the associated smart contract with the nested signatures listed on the completed transaction. In this example, the later smart contracts generated will contain all referrers on the chain, and not necessarily the earliest or shortest referral chain will be provided a result distribution.

In order to circumvent fraud of member profiles, which are attempting to avoid participating in the chain, in one example, if a profile 'B' attempts to bypass an earlier referrer 'A' by sending a referral notice signed only by B's signature back to the seller, then previously logged notices may be referenced to identify the origin of B, since B was not the original referrer. For example, since 'A' was an earlier party to the referral chain, when A sent back to the seller, a referral notice, such as a link of nested signed contents, A also sent a list of profiles referred by A. The seller verifies the claim by sending the list to the social media site to verify if the post is visible to the expected parties. B's referral notice must contain valid nested signed contents that correspond to A, as the seller already has information about B being referred by A, otherwise, the seller could not find the path on the current referral tree and B's claim would be rendered invalid unless it specified A as a referral party.

One approach to tracking online referral chains and result distribution referrers according to pre-defined rules may provide the seller generating digitally signed sales contents for tracking the referral chain. The referrer generates nested signed contents with a list of profiles reached as a referral notice back to the seller. The seller may verify the list by checking with the social media site and filing a smart contract on the blockchain. The smart contract contains the latest referral chain, and if triggered, will distribute result distribution to all referrers in the chain according to the pre-defined rules. The existence of a triggered smart transaction will invalidate other smart contracts based on the signed sales contents. The blockchain enabled mechanisms are implemented by "shared" and "buy" options/button on a social media account interface of a user device.

FIG. 1A illustrates a logic diagram of advertisement and rule management configuration using a blockchain, according to example embodiments. Referring to FIG. 1A, the example diagram 100A provides an initial operation of publishing a new advertisement and defining a rule 102 which governs the referral capabilities of members to social network sites. A first entity or user profile 'A1' may accept the agreement and publish the advertisement 103. The information for that agreement is recorded including A1's information, address and timestamp 104. Any subsequent referrer profile which accepts the agreement, such as B1—105, B2—108 and BN—111 are subject to the earlier formed entity agreements and their information. For example, A2 accepted the agreement 106 as well as A'N' 109. The information for those profiles was also recorded 107/110. The subsequent parties B1, B2 . . . BN are all in agreement with the advertisement agreement at a later time than the original profiles A1-AN, and thus are subject to the information chain history of those original agreeing parties.

Figure 1B:
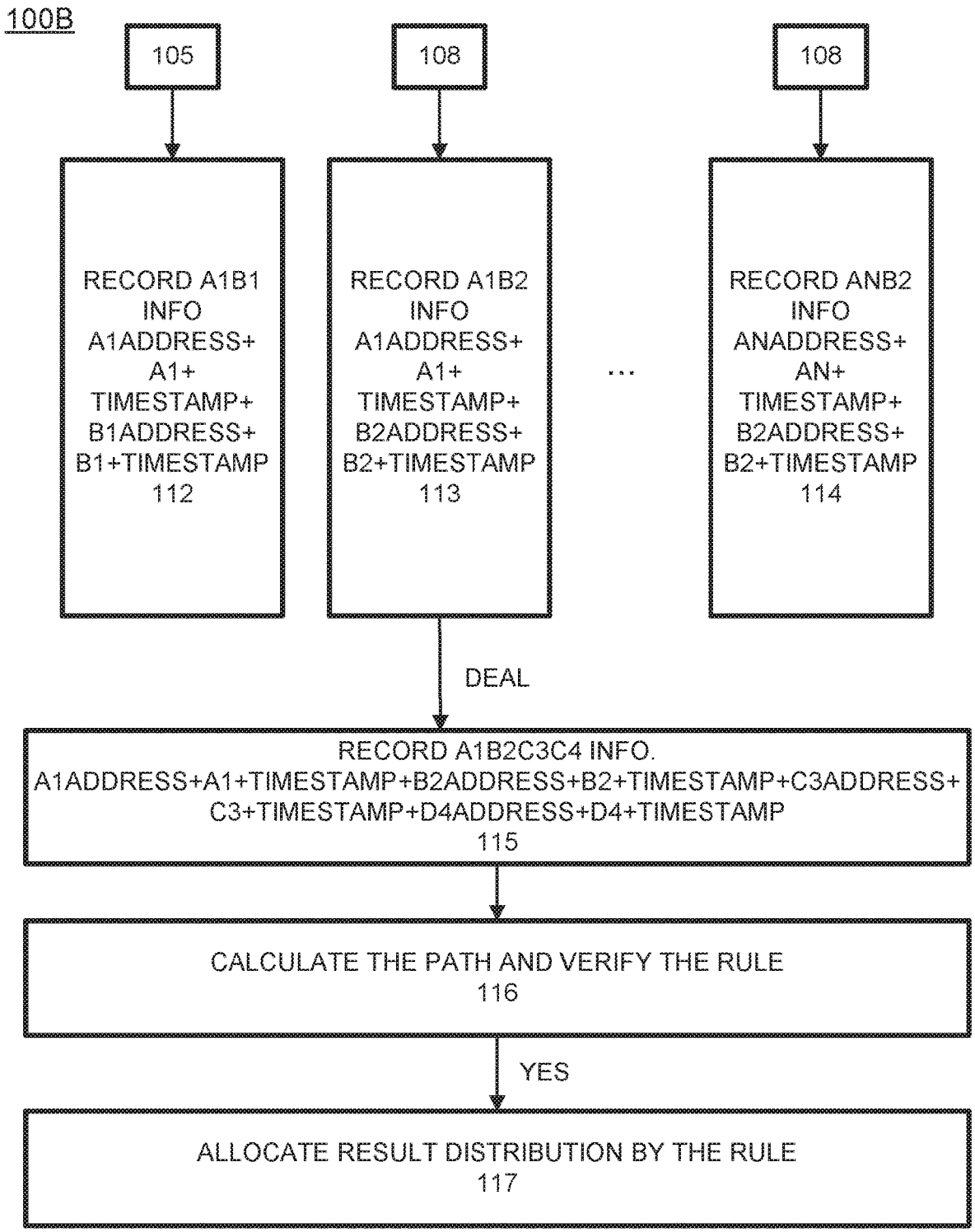
FIG. 1B illustrates a continuation of the logic diagram of FIG. 1A, according to example embodiments.

FIG. 1B illustrates a continuation of the logic diagram of FIG. 1A, according to example embodiments. In FIG. 1B, the configuration 100B provides details of the data recorded for the combination of original agreement parties A1-AN and the subsequent agreement parties B1-BN. For example, transaction data 112 includes the recorded information of A1 and B1 combined, transaction data 113 includes the recorded information of A2 and B2, and transaction data 114 includes the recoded information of AN and B2. A "deal" is identified as having taken place by a certain entity. As a result, all the information of all parties which referred the advertisement are recorded in the final recordation 115. This enables the referrer path 116 to be verified and the result to be allocated accordingly based on the rule and the parties to the agreements 117.

Figure 1C:
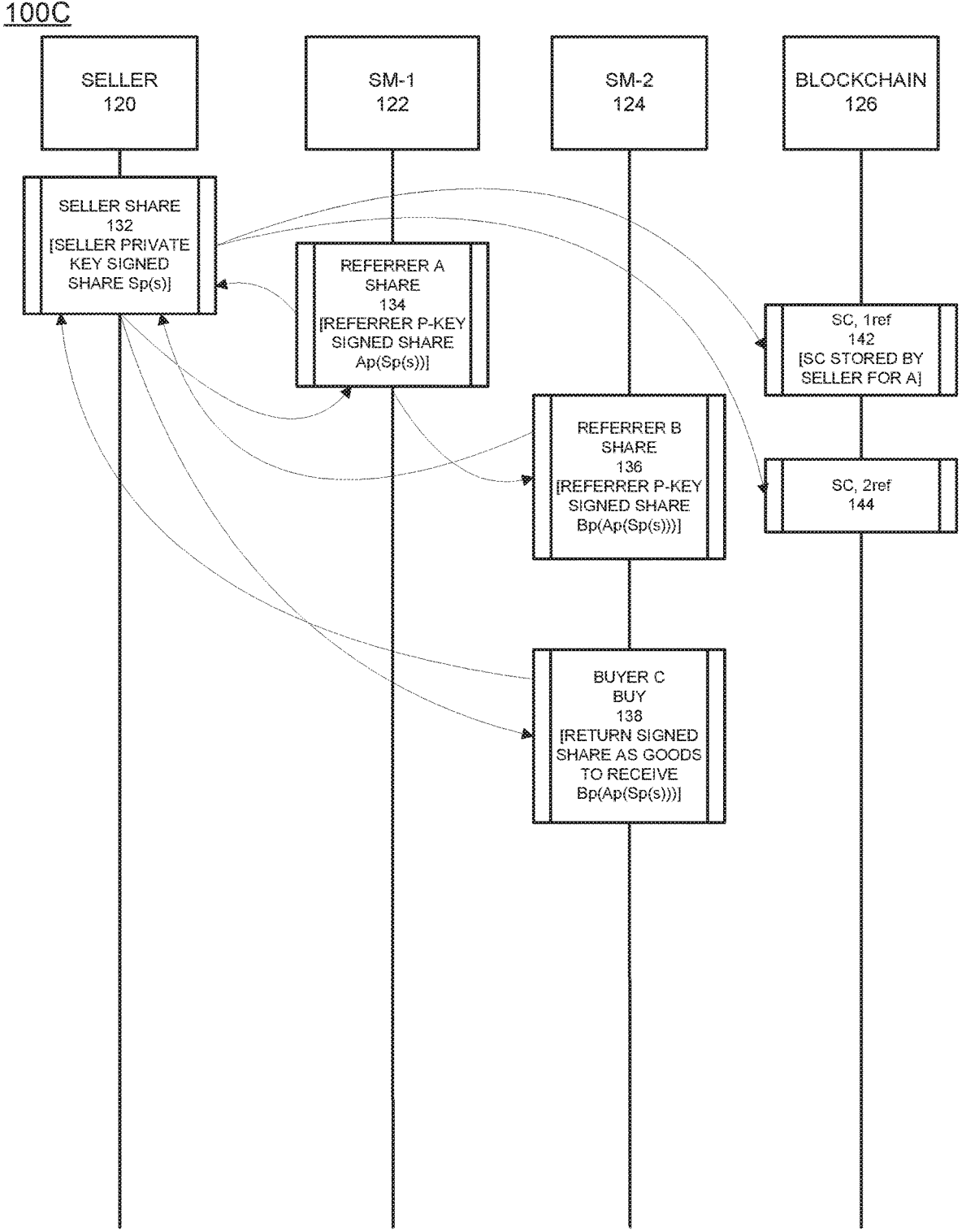
FIG. 1C illustrates a system diagram configuration for managing the sharing and distribution of advertisements, according to example embodiments.

FIG. 1C illustrates a system diagram configuration for managing the sharing and distribution of advertisements, according to example embodiments. Referring to FIG. 1C, the example implementation includes a system 100C with the seller 120, SM-1 122, SM-2 124 and blockchain 126. The entities SM-1 and SM-2 are two instances of social media (SM). The process begins with the seller sharing 132 the advertisement, which includes a seller signed private key Sp(s) as an initial key for the initial advertisement, rules, and results provided to those that participate in the sharing process. A first referrer 'A' may be a user profile of a social media account that may share the advertisement 134 to linked contacts. The referrer 'A' may also digitally sign with a signature originally signed by the seller and any preceding referrers, which in this example there are none prior to 'A' so the user profile 'A' is the second party to sign the shared advertisement. Next, a smart contract with the first referral 142 and the referrer information (ID, address, timestamp, etc.) is created and stored on the blockchain 160 as a first updated smart contract. As the next referrer 'B' shares the referred advertisement 136, the signed and shared transaction Bp(Ap(Sp))) is created and also stored on the blockchain as a new smart contract 144 that includes all the referred parties up until the current time. The next user profile 'C' that encounters the advertisement on their online social networking application feed, may be an actual buyer of the product being advertised, or buyer 'C', that buys the product, and thus the referral information leading up to the purchase is saved 138 and stored on the blockchain for record purposes in another blockchain transaction.

Figure 1D:
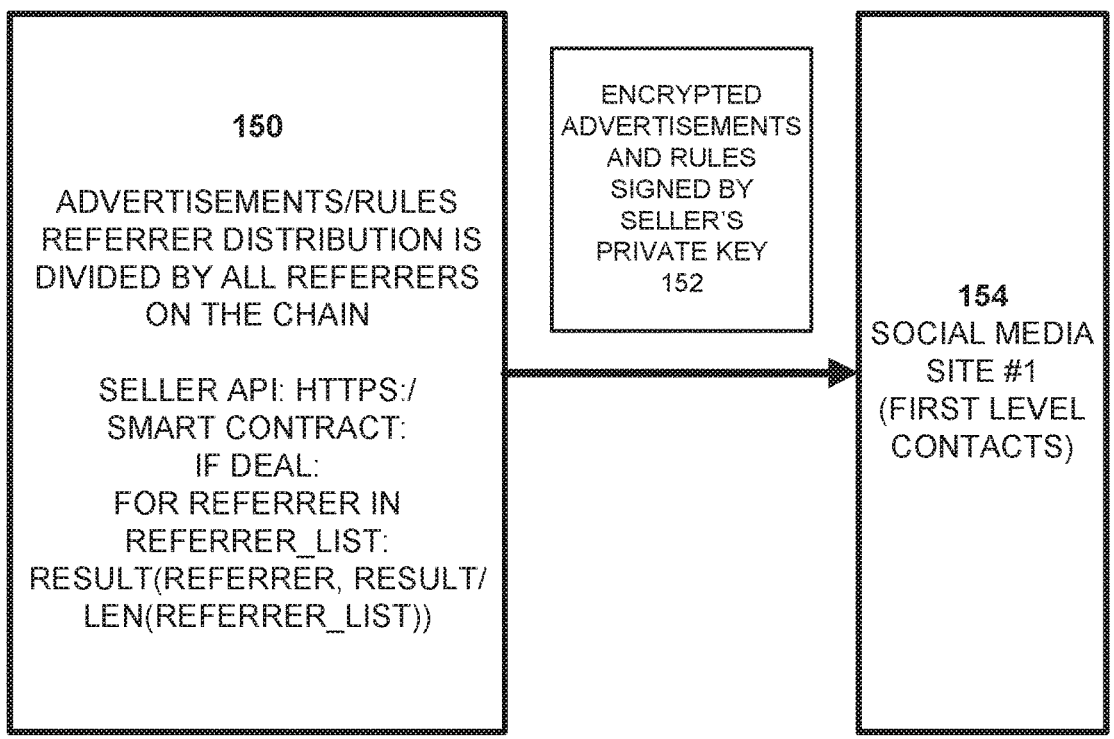
FIG. 1D illustrates a logic diagram of a seller creating an advertisement and rule management smart contract, according to example embodiments.

FIG. 1D illustrates a logic diagram of a seller creating an advertisement and rule management smart contract, according to example embodiments. Referring to FIG. 1D, the example 100D provides a setup of an advertisement combined with rules 150, advertisement content, result information to be distributed to the referrers, etc., and how that result is to be divided by the referrers participating in the social media sharing of the advertisement. The smart contract information is also illustrated as an initial smart contract identifying the owner of the advertisement and the result structure, rules, etc., but without predefined referrers since the advertisement has not yet been shared and forwarded by any referrers and on to unknown future referrers, referees and/or potential purchasers. The seller's private key is used to sign and encrypt the advertisement data 150 into an encrypted version 152, which can then be passed onto an initial social media site 154 associated with a first level of contacts associated with the seller entity.

Figure 1E:
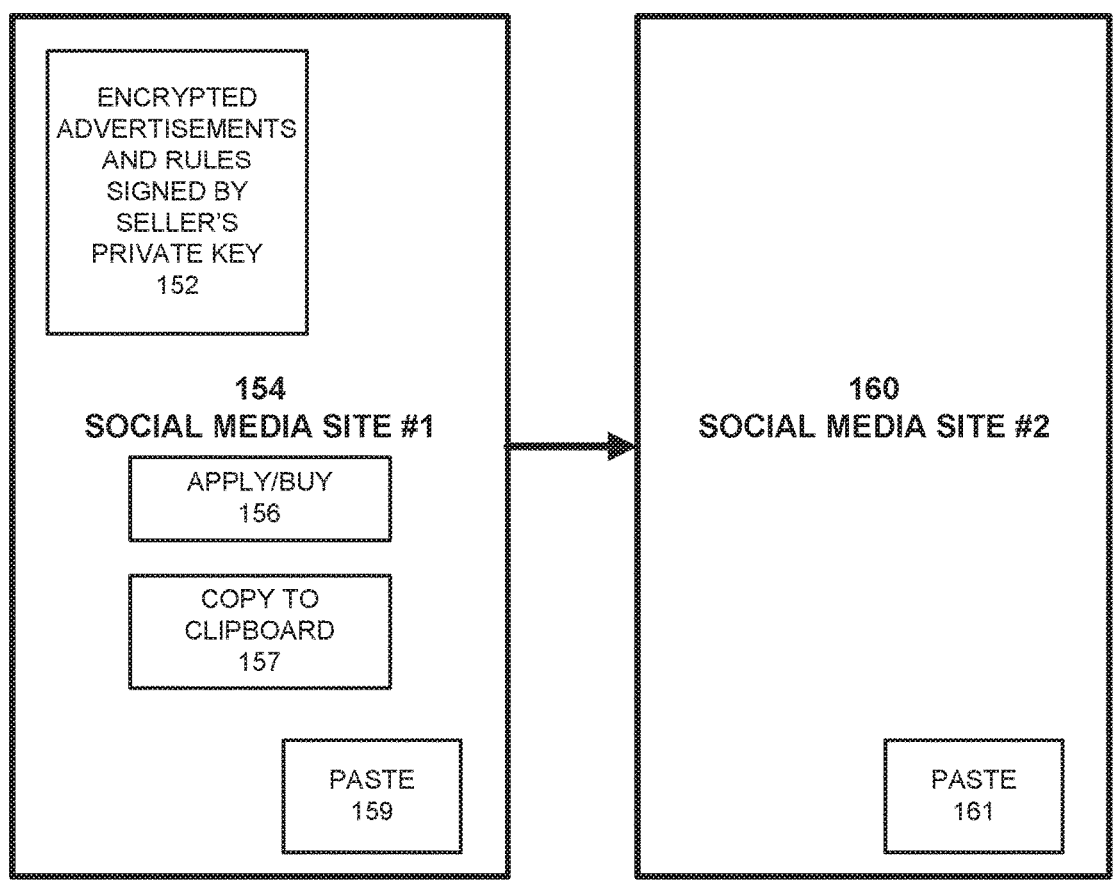
FIG. 1E illustrates a logic diagram of advertisement sharing between two different user profiles and/or social media platforms, according to example embodiments.

FIG. 1E illustrates a logic diagram of advertisement sharing between two different user profiles and/or social media platforms, according to example embodiments. Referring to FIG. 1E, the same reference numerals represent same elements throughout all the drawings. In this example of 100E, the social media site 154 may include an interface with options to buy 156 the product advertised by the advertisement 152, copy 157 the advertisement for sharing, and paste 159 the contents of what is copied. The next social media site 160 may be a recipient of the advertisement which may be pasted 161 onto the next shared entity, such as a profile linked to the user account of 'A' on the second social media site.

Figure 1F:
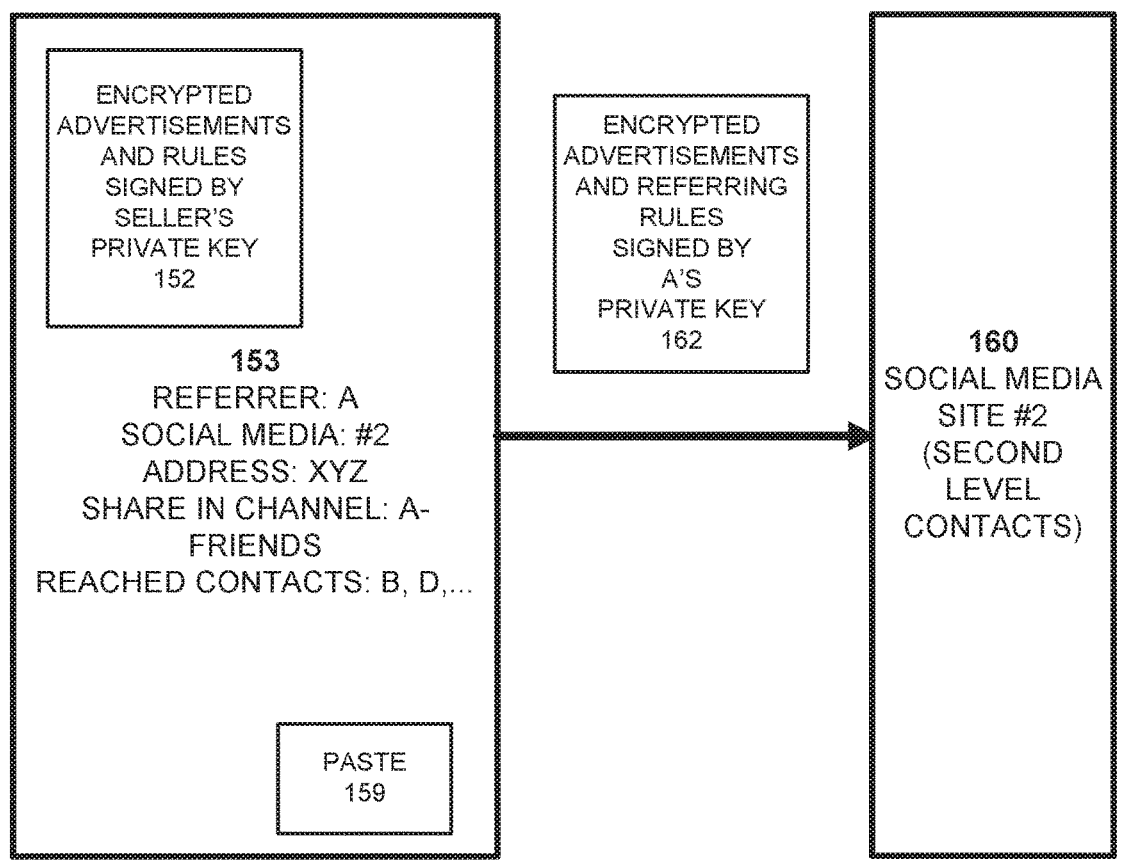
FIG. 1F illustrates a logic diagram creating an updated shared advertisement with another user profile's encryption key, according to example embodiments.

FIG. 1F illustrates a logic diagram creating an updated shared advertisement with another user profile's encryption key, according to example embodiments. Referring to FIG. 1F, the example 100F includes the referrer 'A' having their information incorporated into a new advertisement that is created responsive to the sharing operation. The new advertisement is the same advertisement, however, new profile information is appended to demonstrate lineage from the seller, to user profile 'A' and now to the next recipient (e.g., referrers, buyers, etc.). The information that is updated 153 identifies the original seller via the original encrypted information 152 and the new party 'A' along with that profile information. The information can then be formatted 162 and shared with the next social media site 160 and on to new contacts. During the share operation, the paste option may invoke an automated appending of the referrer A's personal profile information.

Figure 1G:
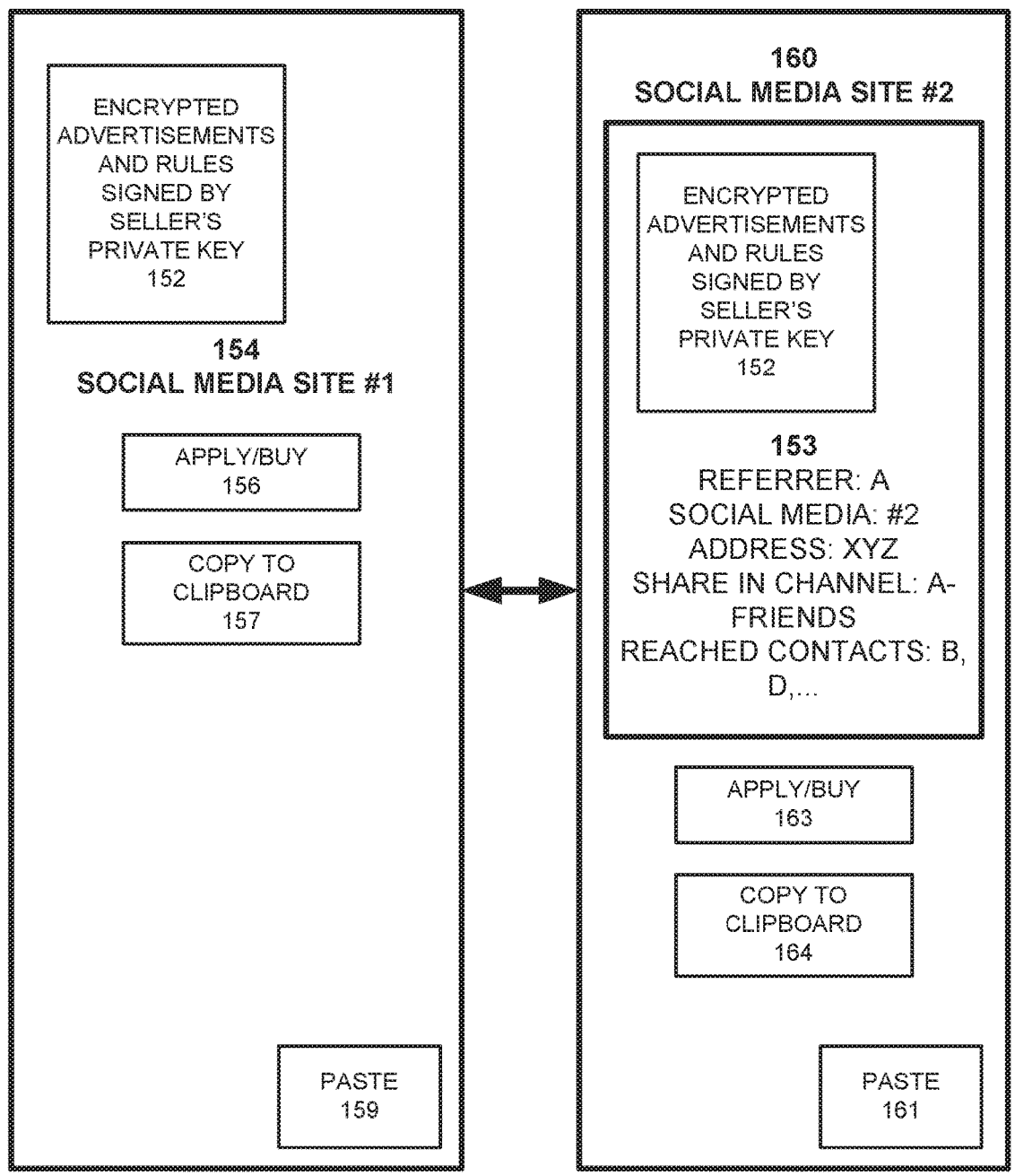
FIG. 1G illustrates a logic diagram of successfully shared referral message between two different user profiles and/or social media platforms, according to example embodiments.

FIG. 1G illustrates a logic diagram of successfully shared referral message between two different user profiles and/or social media platforms, according to example embodiments. Referring to FIG. 1G, the in this example, the social media sites #1-154 and #2-160 have shared information about the advertisement which was originally on site 154 and now is also on site 160. The second site 160 also has the options to buy 163, copy 164 and paste 161 information pertaining to the advertisement so it can be shared on an additional site, which keeps the sharing process an ongoing process.

Figure 1H:
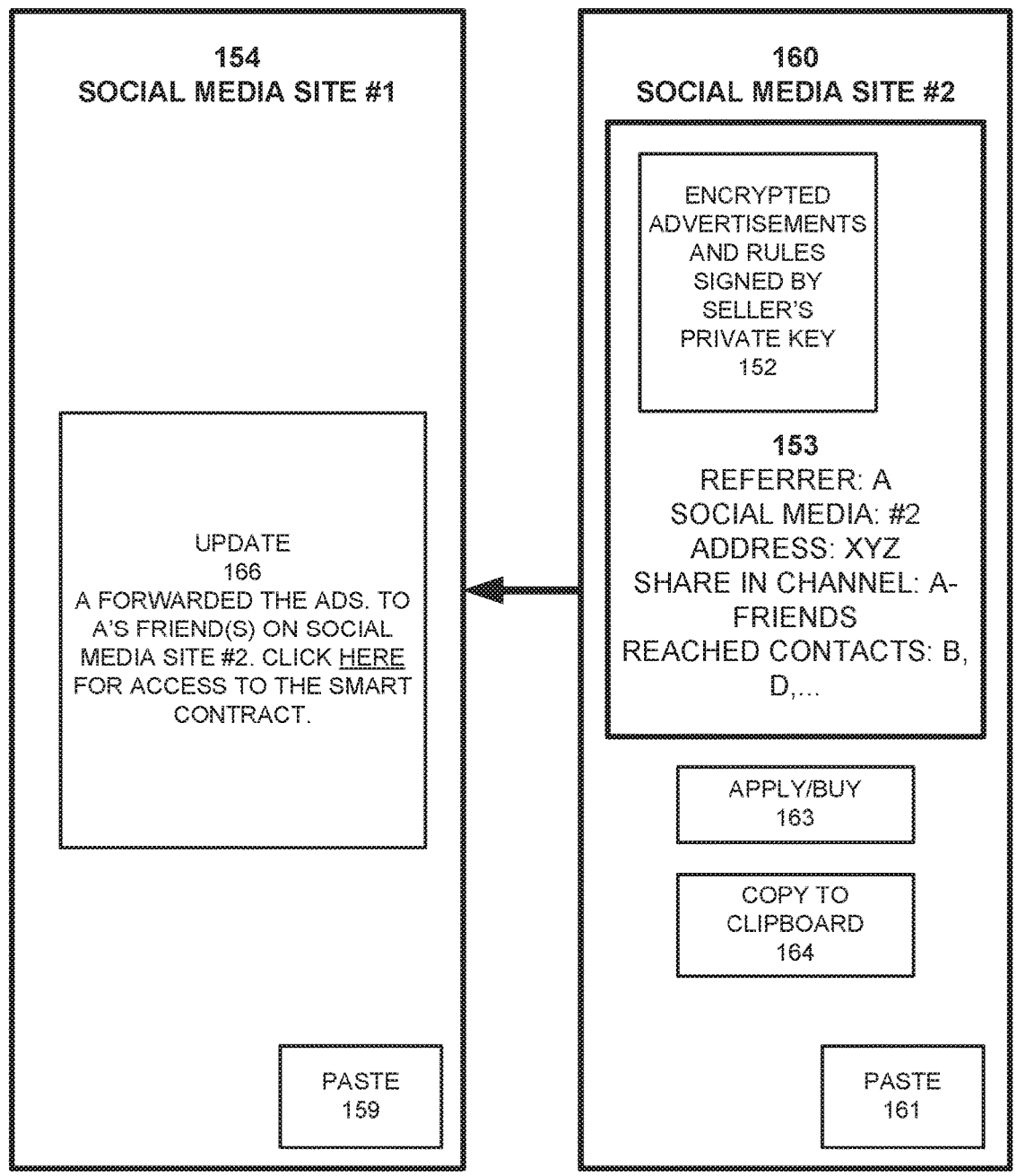
FIG. 1H illustrates a logic diagram of an advertisement sharing operation being identified and shared with the previous user profile included in the sharing procedure, according to example embodiments.

FIG. 1H illustrates a logic diagram of an advertisement sharing operation being identified and shared with the previous user profile included in the sharing procedure, according to example embodiments. Referring to FIG. 1H, in this example 100H, the first social media site 154 being operated by referrer A receives an update 166 that the advertisement was successfully shared with site #2 160 and that the smart contract has been updated to reflect the lineage for final result disbursement at the end of the advertisement campaign. The process for the seller saving the smart contract on the blockchain and any updates to the smart contract may provide generating a referral list by unpacking any received attachments using the referrer's public key. If there are multiple referrers then their public keys are used sequentially to obtain a result. An operation is then preformed to check if every referral is valid and if the referrer is in the reached contacts of a last referrer. The original post is saved with an updated smart contract on the blockchain and this includes the referral list with addresses for result disbursements.

Figure 1I:
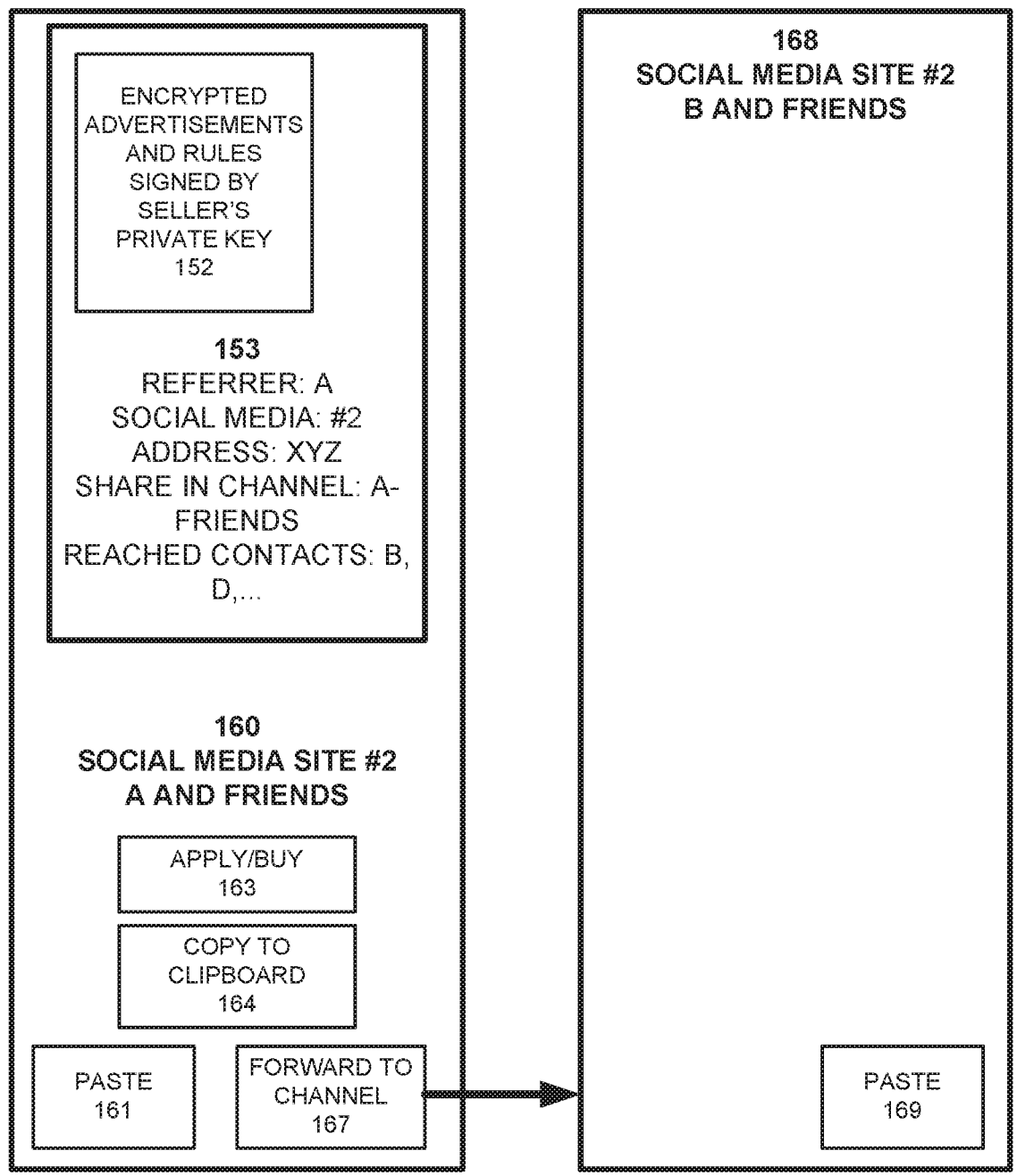
FIG. 1I illustrates a logic diagram of advertisement sharing between additional user profiles and/or social media platforms to demonstrate a next-level sharing operation, according to example embodiments.

FIG. 1I illustrates a logic diagram of advertisement sharing between additional user profiles and/or social media platforms to demonstrate a next-level sharing operation, according to example embodiments. Referring to FIG. 1I, the configuration 100I provides an example where the social media site #2-160 has an advertisement with the referrer A reference information 153, and the original seller's reference information 152. The media site #2may be operated by the user profile B, which may again refer the advertisement to another colleague/connection on the same social media site 168 via a forward operation 167 to the connection's profile, which may also have similar options, such as copy, paste 169 and forward.

Figure 1J:
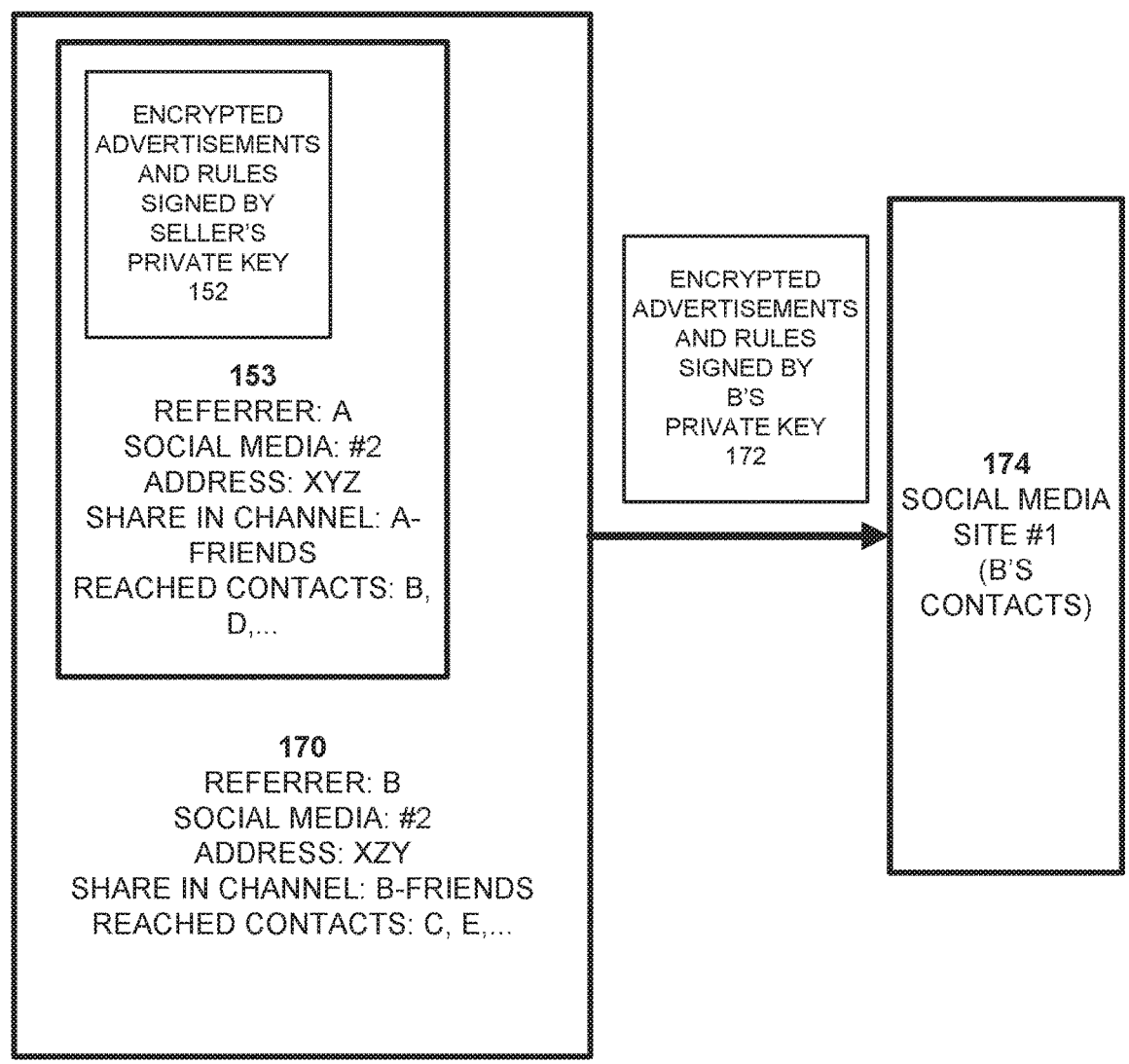
FIG. 1J illustrates a logic diagram of yet another advertisement sharing operation being performed and another signing operation by yet another user profile account while preserving provenance of previous referral agreements, according to example embodiments.

FIG. 1J illustrates a logic diagram of yet another advertisement sharing operation being performed and another signing operation by yet another user profile account while preserving provenance of previous referral agreements, according to example embodiments. In this example 100K, the forward option causes the auto appending of user profile B's information to be incorporated into the advertisements, via referrer B information 170 along with referrer A information 153 and the seller information 152. The information is again encrypted, this time with user B's key 172 and forwarded to the next social media site/profile 174 for additional marketing/purchase options. Each time the next referrer is appended to the advertisement, the seller is notified and/or the seller's original smart contract is again modified and written to the blockchain to continue establishing provenance with all referrers as parties to the agreement and as potential result agents which receive part of the final disbursed result.

FIG. 1K illustrates an example of a revised smart contract that includes additional referrers which will be part of the final distribution results, according to example embodiments. Referring to FIG. 1K, the example smart contract 100K includes the same advertisement rules, etc., established originally 180 and references to the referrers included in the chain leading up to a purchase including their profile names, address information, blockchain data, etc.

Figure 2A:
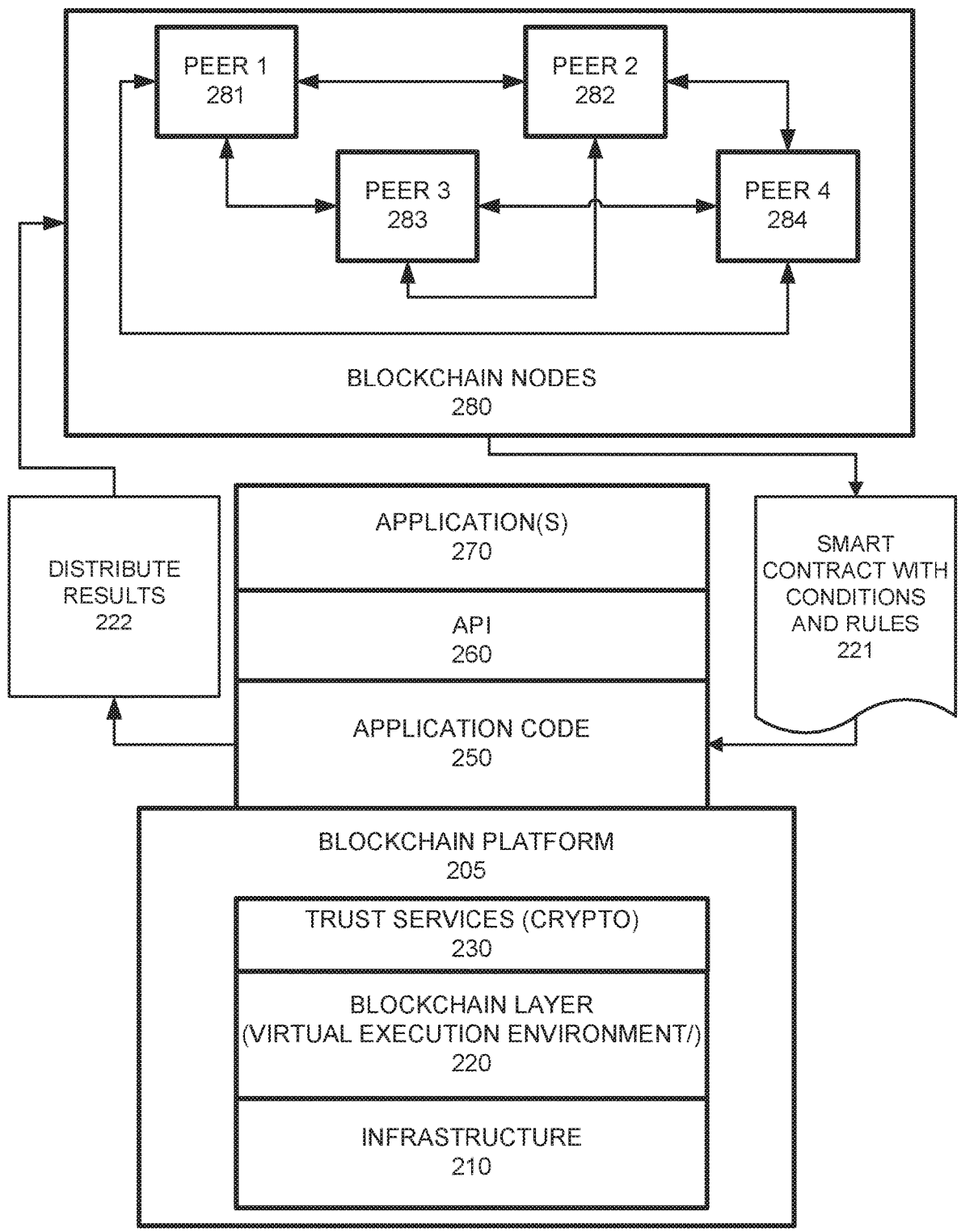
FIG. 2A illustrates an example advertisement referral configuration in a blockchain architecture, according to example embodiments.

FIG. 2A illustrates a blockchain system architecture configuration 200A, according to example embodiments. Referring to FIG. 2A, blockchain architecture 200A may include certain blockchain elements, for example, a group 280 of blockchain nodes 281-284 which participate in blockchain transaction addition and validation process (consensus). One or more of the blockchain nodes 281-284 may endorse transactions and one or more blockchain nodes 281-284 may provide an ordering service for all blockchain nodes in the architecture 200A. A blockchain node may initiate a blockchain authentication and attempt to write to a blockchain immutable ledger stored in blockchain layer 220, a copy of which may also be stored on the underpinning physical infrastructure 210. The blockchain configuration may include one or more applications 270, which are linked to application programming interfaces (APIs) 260 to access and execute stored program/application code 250 (e.g., chaincode, smart contracts, etc.), which can be created according to a customized configuration sought by participants and can maintain their own state, control their own assets, and receive external information.

The blockchain base or platform 205 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 220 may expose an interface that provides access to the virtual execution environment necessary to process the program code and engage the physical infrastructure 210. Cryptographic trust services 230 may be used to verify transactions such as asset exchange transactions and keep information private.

The blockchain architecture configuration of FIG. 2A may process and execute program/application code 250 via one or more interfaces exposed, and services provided, by blockchain platform 205. The code 250 may control blockchain assets. For example, the code 250 can store and transfer data, and may be executed by nodes 281-284 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. In one example, an initial smart contract 221 may be stored on the blockchain with conditions, rules and other information necessary to begin the referral processes. The smart contract may be accepted by the referrers when they decide to refer an active advertisement. The results of the referring may yield a result distribution being distributed 222 to those parties that participated in the broadcast/distribution of the active ads., and which likely resulted in a purchase of the product, however, the smart contract may be setup to provide those parties a result distribution regardless of any purchases being made. Examples of rules may provide how a result is divided. For example, is the result of advertisement sharing evenly distributed to all tiers of referrers, or do the higher tier receive a larger result, etc. Such rules may be determined by the seller and may be part of the smart contract.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. In operation, the chaincode may receive a hash and retrieve from the blockchain a hash associated with the data template created by a previously stored feature extractor. If the hashes of the hash identifier and the hash created from the stored identifier template data match, then the chaincode sends an authorization key to the requested service. The chaincode may write to the blockchain data associated with the cryptographic details.

Figure 2B:
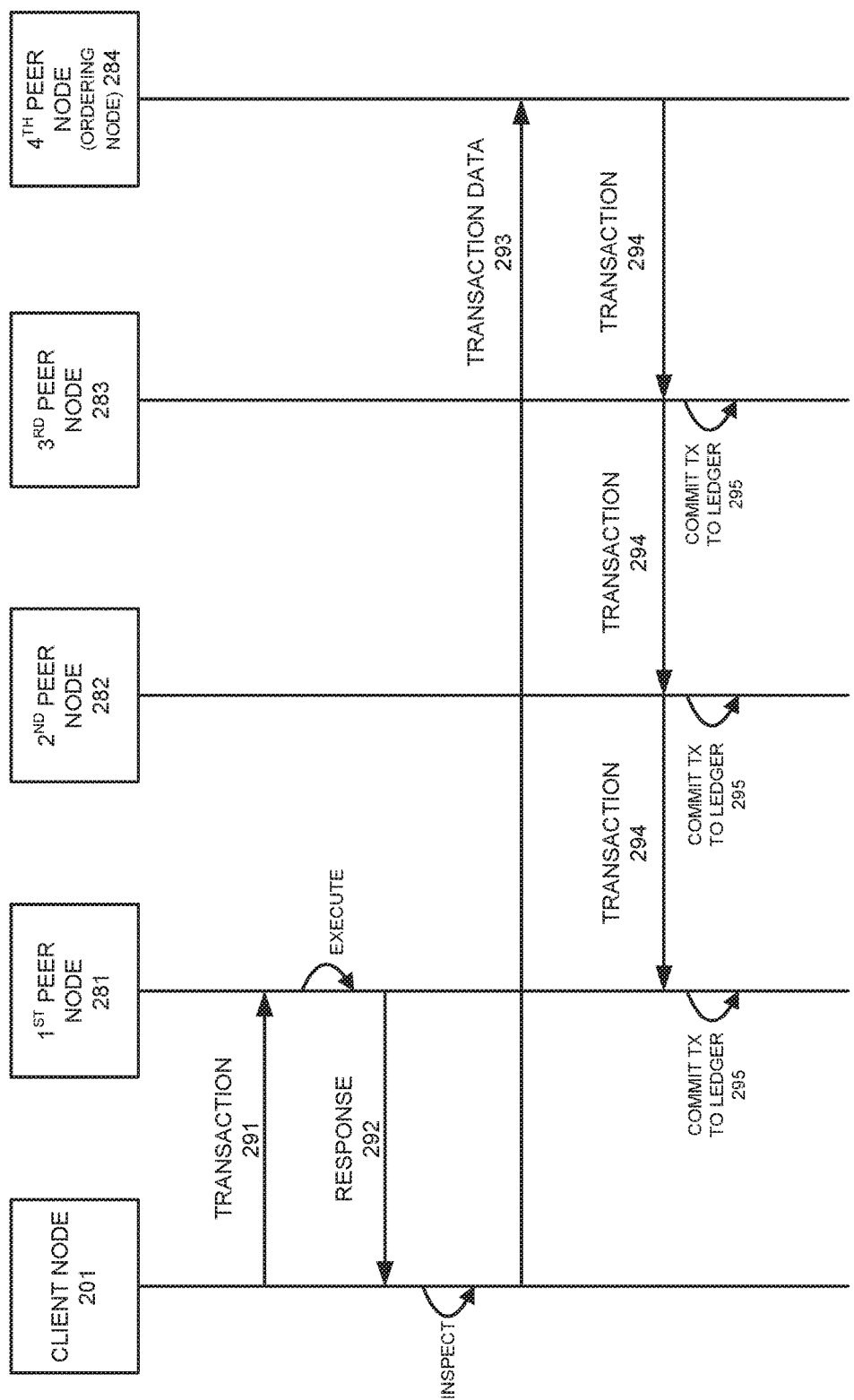
FIG. 2B illustrates an example peer node blockchain configuration, according to example embodiments.

FIG. 2B illustrates an example of a transactional flow 200B between nodes of the blockchain in accordance with an example embodiment. Referring to FIG. 2B, the transaction flow may include a transaction proposal 291 sent by an application client node 201 to an endorsing peer node 281. The endorsing peer 281 may verify the client signature, and execute a chaincode function to simulate the transaction. The output may include the chaincode results, a set of key/value versions that were read in the chaincode (read set), and the set of keys/values that were written in chaincode (write set). The proposal response 292 is sent back to the client 201 along with an endorsement signature, if approved. The client 201 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results, and authenticated the signatures against the transaction payload 293.

Referring again to FIG. 2B, the client node 201 initiates the transaction 291 by constructing and sending a request to the peer node 281, which is an endorser. The client 201 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 201, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 201 which parses the payload for the application to consume.

In response, the application of the client 201 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 201 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
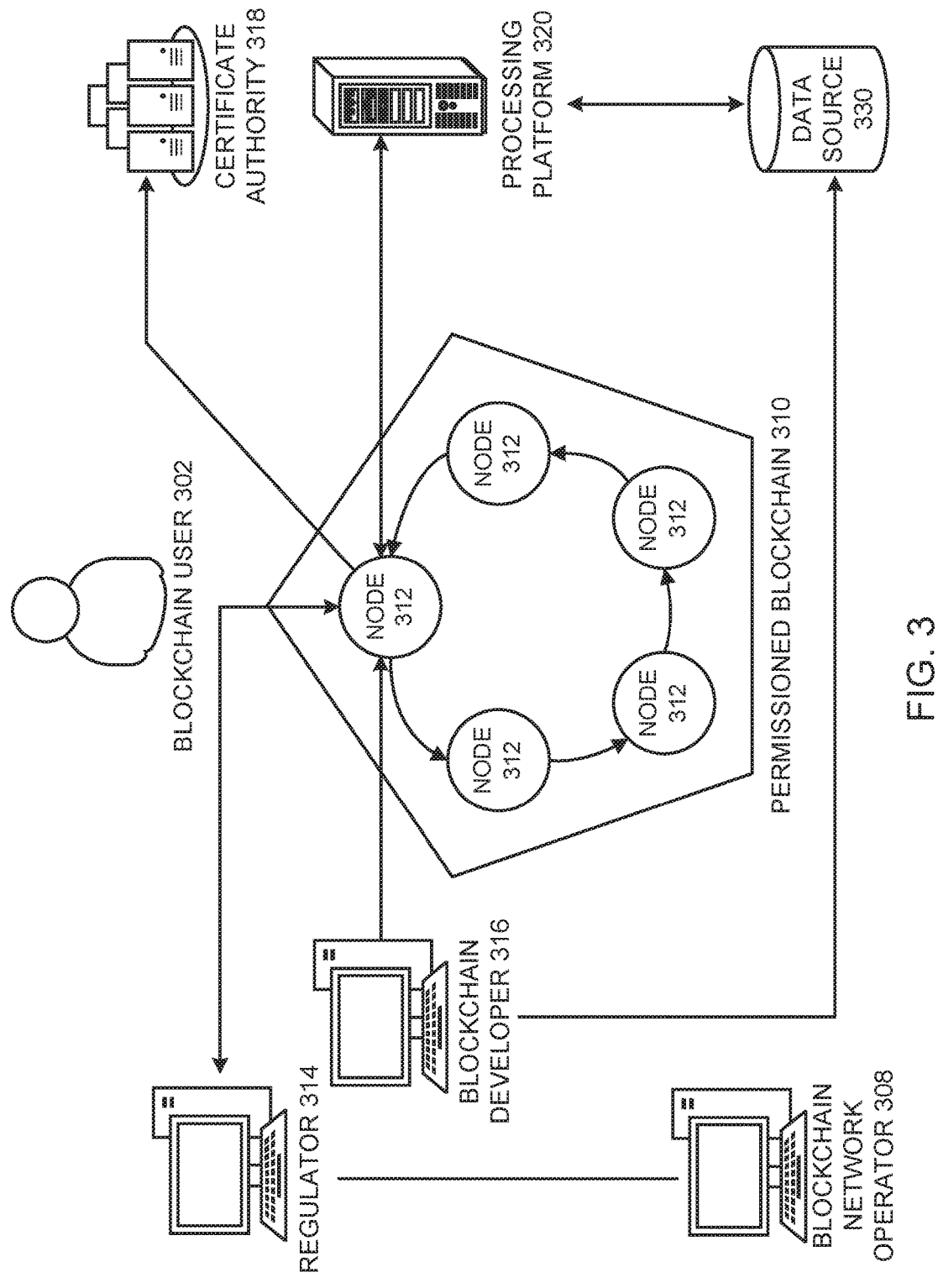
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator node 308 manages member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4:
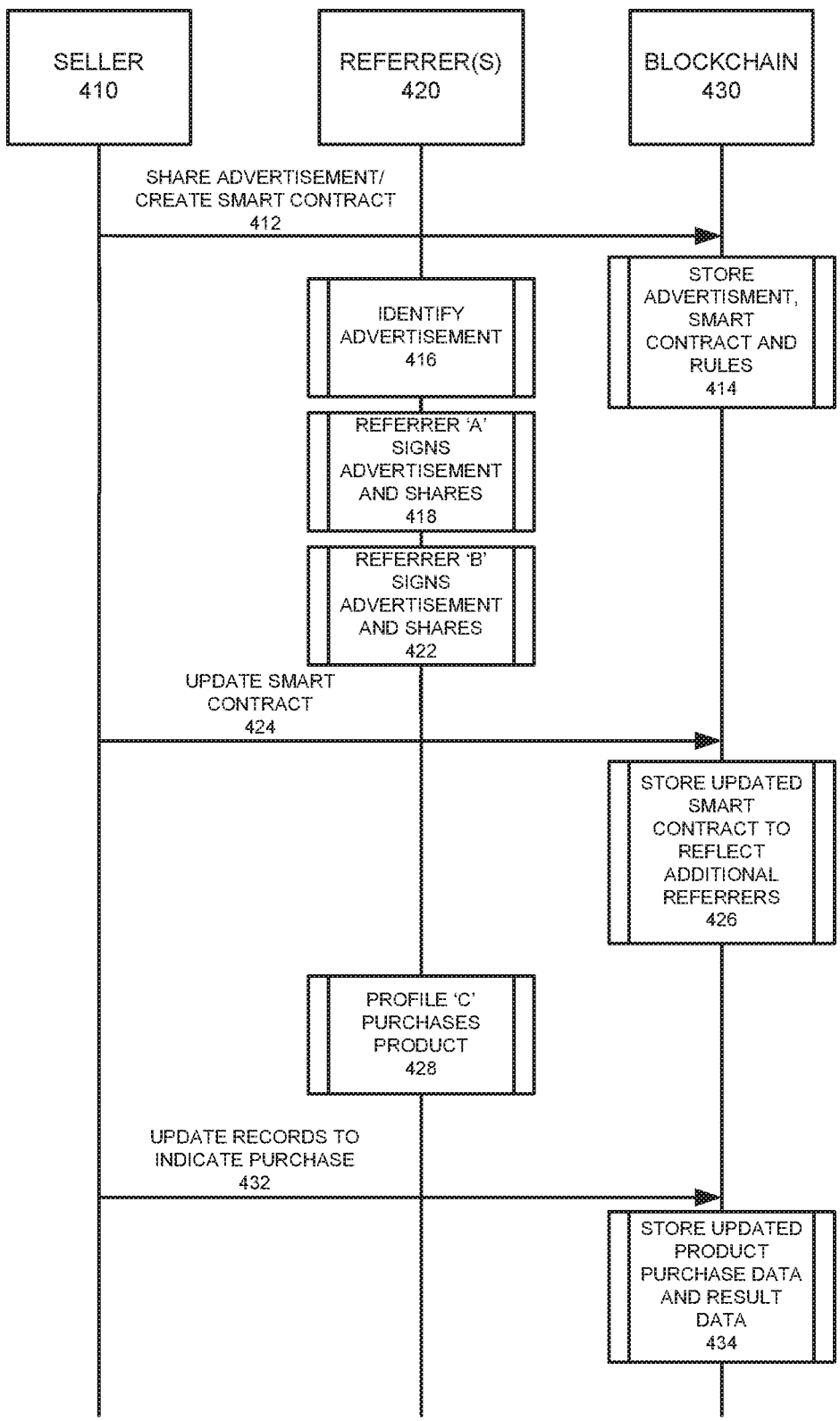
FIG. 4 illustrates a system messaging diagram for managing advertisement referral in a blockchain, according to example embodiments.

FIG. 4 illustrates a system messaging diagram for managing advertisement referral in a blockchain, according to example embodiments. Referring to FIG. 4, the example system configuration 400 includes a seller entity 410 responsible for generating the advertisement, a referrer or referrers 420, and a blockchain 430. In operation, the seller 410 may designate an advertisement to create and share 412 and may also create a smart contract defining the terms of the sharing. The smart contract, the advertisement, and rules governing incentives and result distributions may all be stored 414 in the smart contract on the blockchain 430. A referrer may then identify the advertisement 416 and digitally sign the advertisement 418 and share with others on a social network site. Another referrer may also decide to digitally sign the advertisement and share with others 422. The signatures of both referrers are logged and stored in an updated smart contract 424 which is stored to include information of all referrers known at that time 426. At some point, a user profile 'C' may purchase the product 428, which is generally a trigger to provide the result distribution. The updated records are created to reflect all referring and purchases 432 and the updated information is stored on the blockchain 434.

Figure 5A:
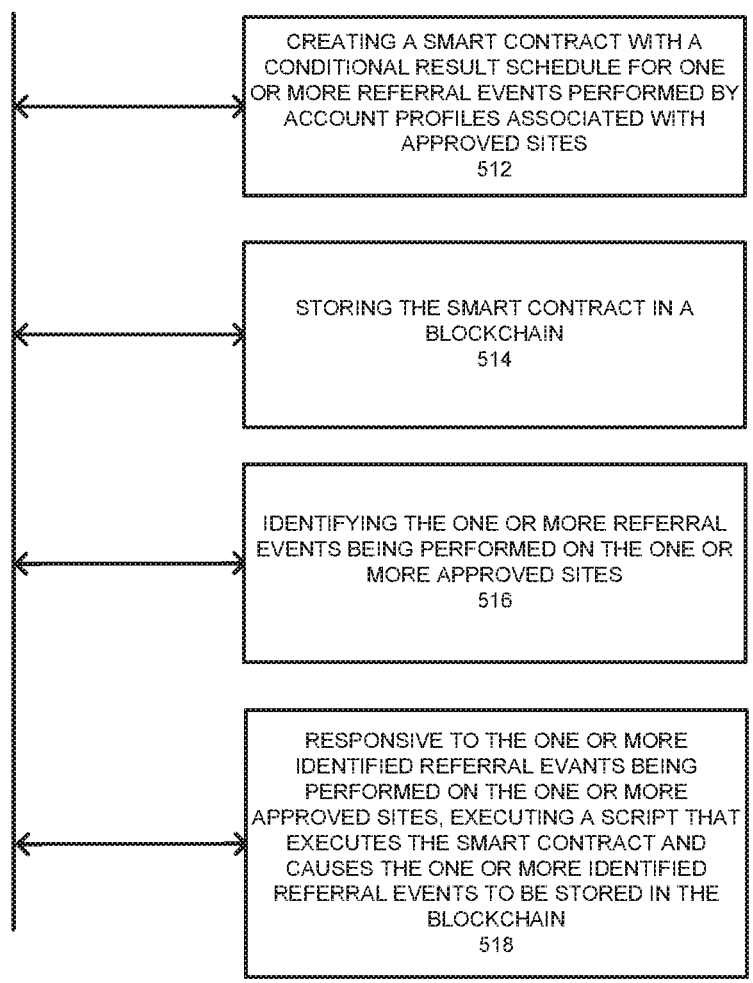
FIG. 5A illustrates a flow diagram of an example method of managing advertisement referrals in a blockchain, according to example embodiments.

FIG. 5A illustrates a flow diagram of an example method of managing advertisement referrals in a blockchain, according to example embodiments. Referring to FIG. 5A, the method 500A may include creating a smart contract with a conditional result distribution schedule for one or more referral events performed by account profiles associated with approved sites 512, storing the smart contract in a blockchain 514, identifying the one or more referral events being performed on the one or more approved sites 516, and storing the one or more referral events in the blockchain 518.

The method may also include responsive to the one or more referral events being performed on the one or more approved sites, executing a script that executes the smart contract and causes the one or more referral events to be stored in the blockchain. The one or more referral events stored in the blockchain each include an account profile associated with the one or more referral events, an address associated with the account profile, a time stamp of the one or more referral events, and an acceptance of a referral compensation agreement. The method may also include identifying a rule associated with compensation for the one or more referral events, determining a referral path used to perform the one or more referral events, and determining an allocation of results to the one or more account profiles associated with the one or more referral events based on the referral path and the rule. The referral path includes a record of a plurality of account profiles and approved sites on which the one or more referral events were posted. The rule includes a result distribution schedule based on the approved sites and a time frame to perform the one or more referral events. The method may also include creating a list of the one or more account profiles which performed the one or more referral events, storing the list in the smart contract, accessing the smart contract, and performing an allocation of results to the one or more account profiles in the list.

Figure 5B:
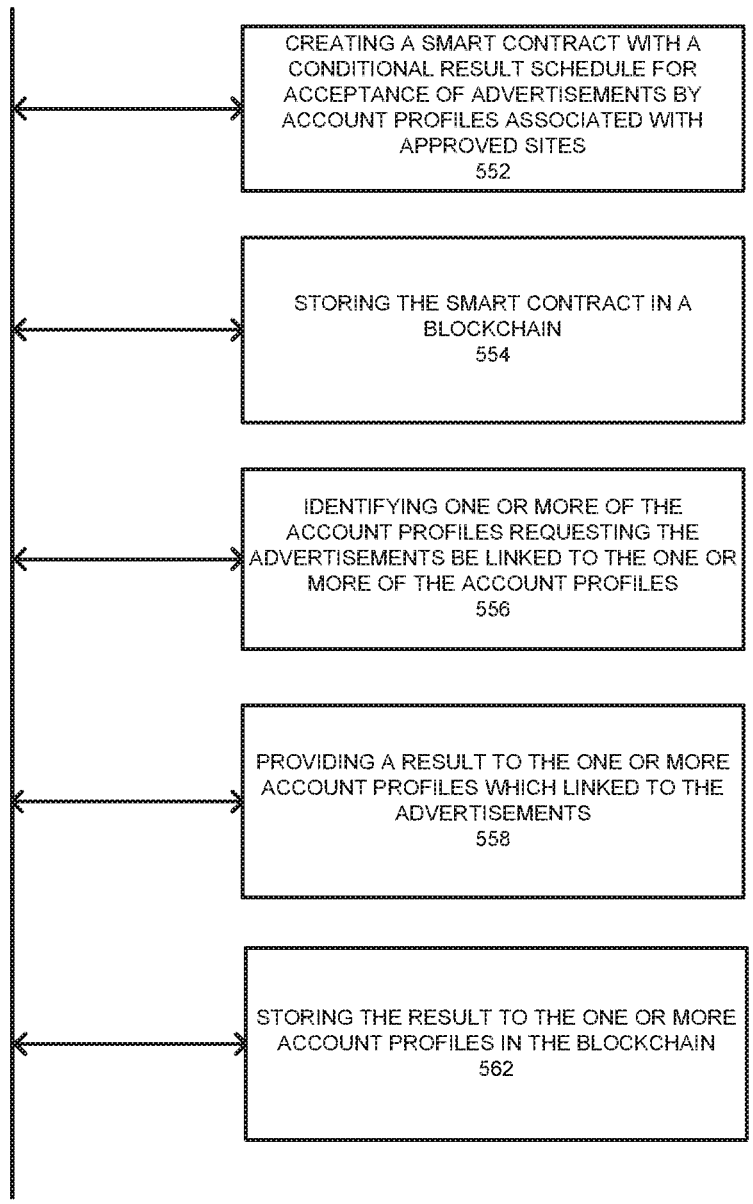
FIG. 5B illustrates a flow diagram of another example method of managing advertisement referrals in a blockchain, according to example embodiments.

FIG. 5B illustrates a flow diagram of another example method of managing advertisement referrals in a blockchain, according to example embodiments. Referring to FIG. 5B, the method 500B may include creating a smart contract with a conditional result distribution schedule for acceptance of advertisements by account profiles associated with approved sites 552, storing the smart contract in a blockchain 554, identifying one or more of the account profiles requesting the advertisements be linked to the one or more account profiles 556, providing a result to the one or more account profiles which linked to the advertisements 558, and storing the result to the one or more account profiles in the blockchain 562.

In addition to providing referral result to referrals which resulted in a sale of a product, the advertisements themselves can be incentivized by providing access to the advertisements to various user account profiles. Those profiles which elect to have the advertisements linked (i.e., displayed, shared, etc.) to their accounts may receive an incentive result over time depending on the nature of the agreement and the terms of the agreements, which may also be stored in a smart contract. The agreement offers those willing to tolerate banners and insertions linked to their dashboard or network of acquaintances, a result for permitting such ads. over a defined period of time and/or a number of actions (e.g., accesses, shares, impressions, etc.).

Figure 6A:
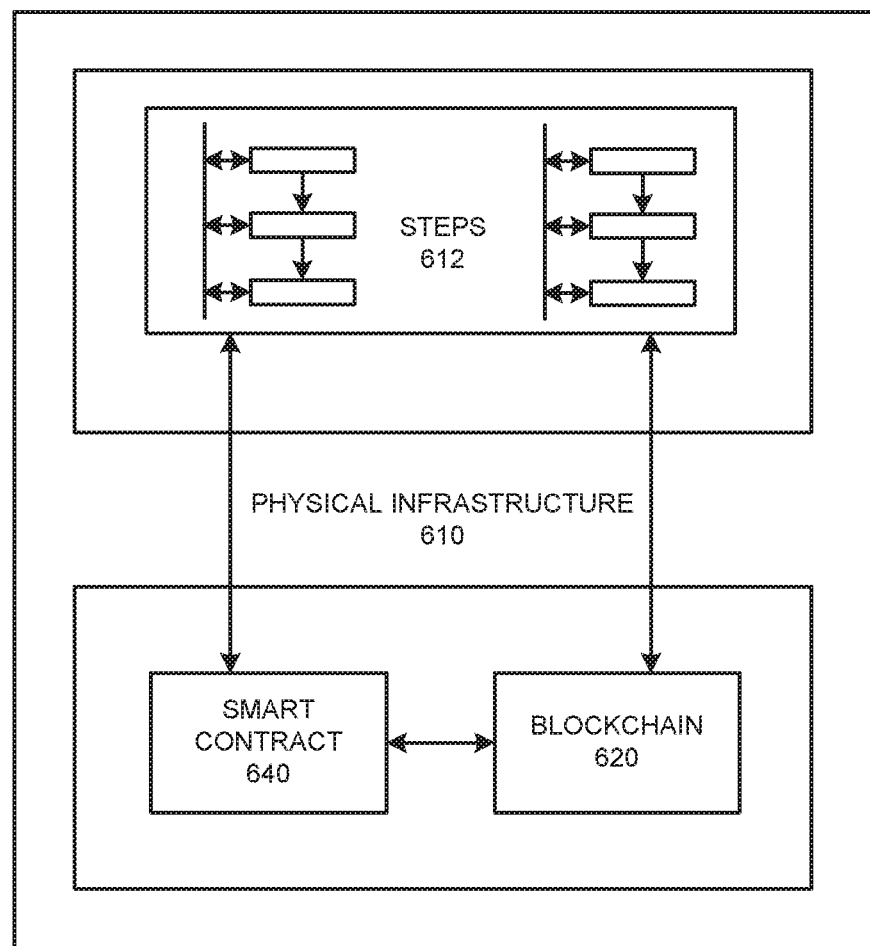
FIG. 6A illustrates an example physical infrastructure configured to perform various operations on the blockchain in accordance with one or more operations described herein, according to example embodiments.

FIG. 6A illustrates an example physical infrastructure configured to perform various operations on the blockchain in accordance with one or more of the example methods of operation according to example embodiments. Referring to FIG. 6A, the example configuration 600A includes a physical infrastructure 610 with a blockchain 620 and a smart contract 640, which may execute any of the operational steps 612 included in any of the example embodiments. The steps/operations 612 may include one or more of the steps described or depicted in one or more flow diagrams and/or logic diagrams. The steps may represent output or written information that is written or read from one or more smart contracts 640 and/or blockchains 620 that reside on the physical infrastructure 610 of a computer system configuration. The data can be output from an executed smart contract 640 and/or blockchain 620. The physical infrastructure 610 may include one or more computers, servers, processors, memories, and/or wireless communication devices.

Figure 6B:
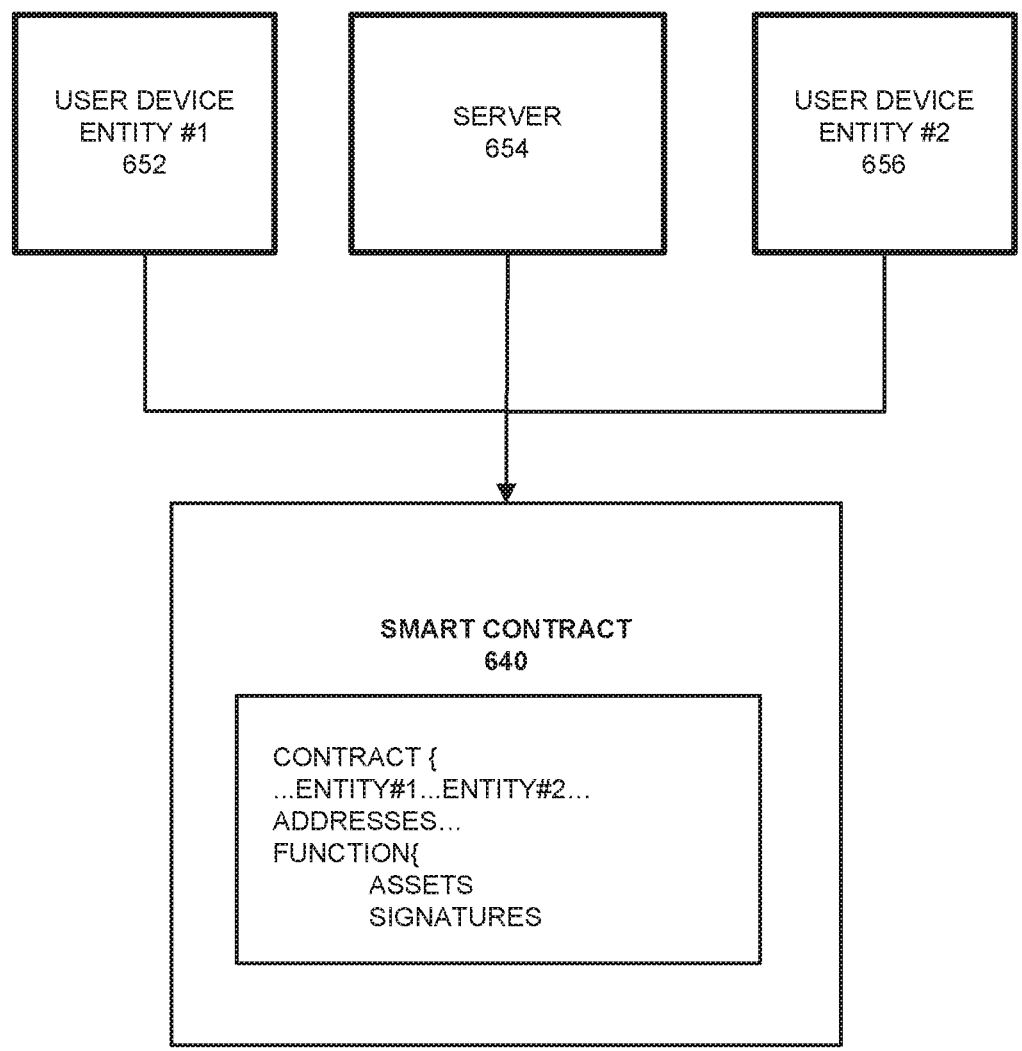
FIG. 6B illustrates an example smart contract configuration among contracting parties and a mediating server configured to enforce smart contract terms on a blockchain, according to example embodiments.

FIG. 6B illustrates an example smart contract configuration among contracting parties and a mediating server configured to enforce the smart contract terms on the blockchain according to example embodiments. Referring to FIG. 6B, the configuration 600B may represent a communication session, an asset transfer session or a process or procedure that is driven by a smart contract 640 which explicitly identifies one or more user devices 652 and/or 656. The execution, operations and results of the smart contract execution may be managed by a server 654. Content of the smart contract 640 may require digital signatures by one or more of the entities 652 and 656 which are parties to the smart contract transaction. The results of the smart contract execution may be written to a blockchain as a blockchain transaction.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
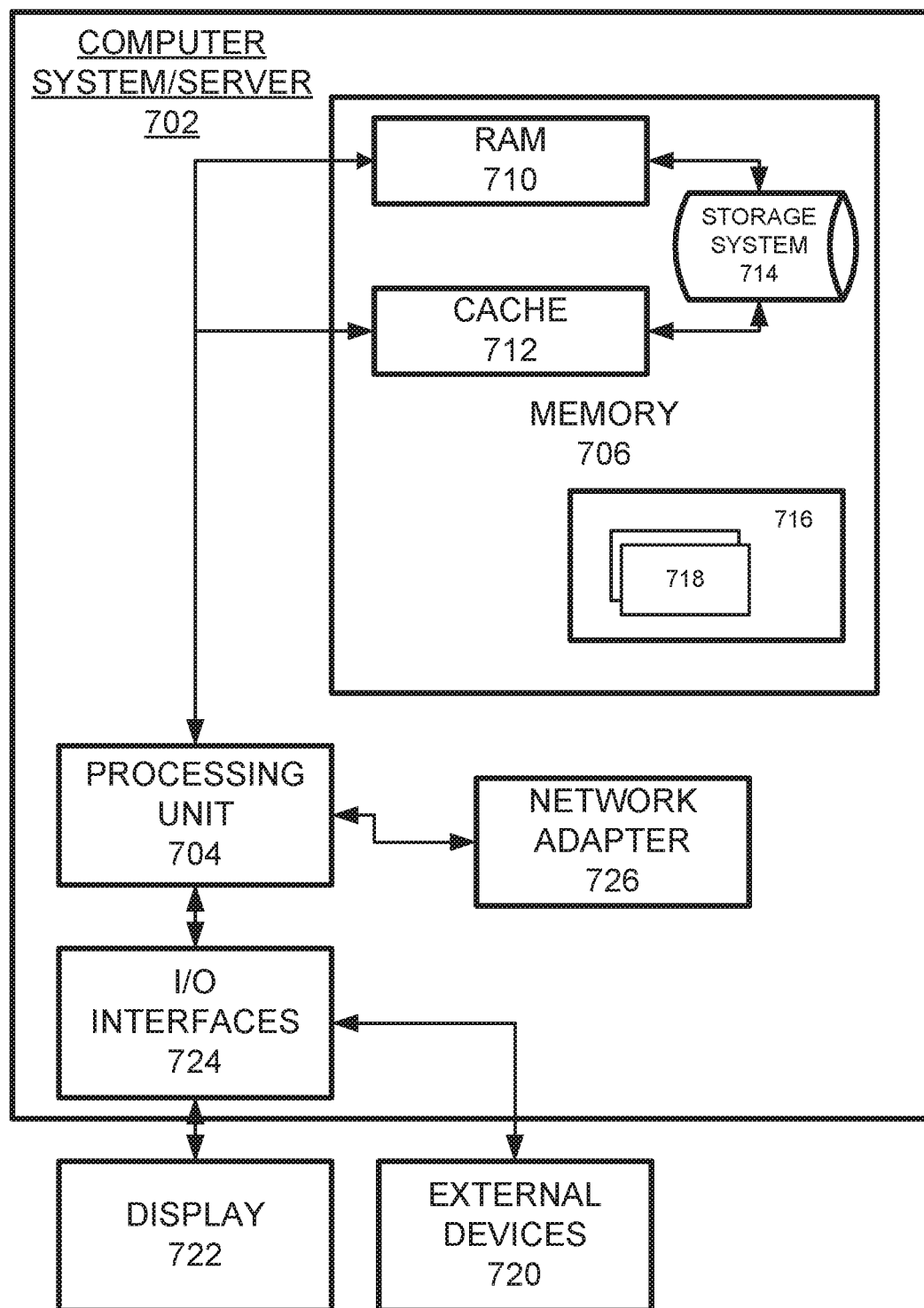
FIG. 7 illustrates an example computer system configured to support one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   receiving a chain of digital signatures of a plurality of account profiles corresponding to a chain of sharing events of content in which content originally posted by an originator on a website is sequentially re-posted by one or more other account profiles on one or more different websites, respectively;
   identifying that the chain of sharing events includes a new sharing event including a new re-posting of the content originally posted by the originator based on a new nested digital signature in the chain of digital signatures which is signed over other nested digital signatures in the chain of digital signatures;
   generating a smart contract comprising the chain of digital signatures corresponding to the chain of sharing events including the new sharing event; and
   storing the generated smart contract in a blockchain;
   wherein a referral path used to perform the chain of sharing events is determined, and an allocation of results to the plurality of account profiles associated with the chain of sharing events is determined based on the referral path.

2. The method of claim 1, further comprising:
   executing a script that causes the chain of sharing events to be stored in the blockchain.

3. The method of claim 1, wherein each sharing event includes an account profile associated with the respective sharing event, an address associated with the account profile, a time stamp of the respective sharing event, and an acceptance.

4. The method of claim 1, wherein the referral path comprises a record of the plurality of account profiles and websites on which the chain of sharing events were sequentially posted.

5. The method of claim 1, further comprising:
   creating a list of the plurality of account profiles which performed the chain of sharing events; and
   storing the list in the smart contract.

6. An apparatus, comprising:
   a hardware processor programmed to:
   receive a chain of digital signatures of a plurality of account profiles corresponding to a chain of sharing events of content in which content originally posted by an originator on a website is sequentially re-posted by one or more other account profiles on one or more different websites, respectively;
   identify that the chain of sharing events includes a new sharing event including a new re-posting of the content originally posted by the originator based on a new nested digital signature in the chain of digital signatures which is signed over other nested digital signatures in the chain of digital signatures;
   generate a smart contract comprising the chain of digital signatures corresponding to the chain of sharing events including the new sharing event; and
   store the generated smart contract in a blockchain;
   wherein a referral path used to perform the chain of sharing events is determined, and an allocation of results to the plurality of account profiles associated with the chain of sharing events is determined based on the referral path.

7. The apparatus of claim 6, wherein the processor executes a script that causes the chain of sharing events to be stored in the blockchain.

8. The apparatus of claim 6, wherein each sharing event includes an account profile associated with the respective sharing event, an address associated with the respective sharing event, a time stamp of the respective sharing event, and an acceptance.

9. The apparatus of claim 6, wherein the referral path comprises a record of the plurality of account profiles and websites on which the chain of sharing events were sequentially posted.

10. The apparatus of claim 6, wherein the processor creates a list of the plurality of account profiles which performed the chain of sharing events; and store the list in the smart contract.

11. A non-transitory computer readable storage medium storing instructions that when executed cause a processor to perform:
  receiving a chain of digital signatures of a plurality of account profiles corresponding to a chain of sharing events of content in which content originally posted by an originator on a website is sequentially re-posted by one or more other account profiles on one or more different websites, respectively;
  identifying that the chain of sharing events includes a new sharing event including a new re-posting of the content originally posted by the originator based on a new nested digital signature in the chain of digital signatures which is signed over other nested digital signatures in the chain of digital signatures;
  generating a smart contract comprising the chain of digital signatures corresponding to the chain of sharing events including the new sharing event; and
  storing the generated smart contract in a blockchain;
  wherein a referral path used to perform the chain of sharing events is determined, and
  an allocation of results to the plurality of account profiles associated with the chain of sharing events is determined based on the referral path.

12. The non-transitory computer readable storage medium of claim 11, wherein the processor
  executes a script that causes the chain of sharing events to be stored in the blockchain.

13. The non-transitory computer readable storage medium of claim 11, wherein each sharing event includes an account profile associated with the respective sharing event, an address associated with the account profile, a time stamp of the respective sharing event, and an acceptance.

14. The non-transitory computer readable storage medium of claim 11, wherein the referral path comprises a record of the plurality of account profiles and websites on which the chain of sharing events were sequentially posted.

15. The non-transitory computer readable storage medium of claim 11, wherein the processor
  creates a list of the plurality of account profiles which performed the chain of sharing events; and
  stores the list in the smart contract.

16. The method of claim 1, wherein the generating the smart contract comprises updating a previous smart contract of the chain of sharing events with a new digital signature of a new referrer corresponding to the new sharing event.

* * * * *